(12) United States Patent
Niemi et al.

(10) Patent No.: US 12,245,328 B2
(45) Date of Patent: Mar. 4, 2025

(54) UE BEHAVIOR FOR FAILED REGISTRATION REQUEST OR SERVICE REQUEST FOR EMERGENCY SERVICES FALLBACK

(71) Applicant: MediaTek Singapore Pte. Ltd., Singapore (SG)

(72) Inventors: Marko Niemi, Oulu (FI); Puneet, Bengaluru (IN)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/371,536

(22) Filed: Jul. 9, 2021

(65) Prior Publication Data

US 2022/0060880 A1    Feb. 24, 2022

(30) Foreign Application Priority Data

Aug. 18, 2020    (IN) .............................. 202021035558

(51) Int. Cl.
*H04W 60/00*    (2009.01)
*H04W 4/90*    (2018.01)
(Continued)

(52) U.S. Cl.
CPC ............... *H04W 8/06* (2013.01); *H04W 4/90* (2018.02); *H04W 60/04* (2013.01); *H04W 60/06* (2013.01); *H04W 76/19* (2018.02)

(58) Field of Classification Search
CPC ......... H04W 8/06; H04W 4/90; H04W 60/04; H04W 60/06; H04W 76/19; H04W 76/16; H04W 76/50
See application file for complete search history.

(56) References Cited

U.S. PATENT DOCUMENTS

| 2020/0178158 A1* | 6/2020 | Won ....................... H04W 48/06 |
| 2022/0038879 A1* | 2/2022 | Won ....................... H04W 4/90 |
| 2022/0053447 A1* | 2/2022 | Bakker ............... H04W 60/005 |

FOREIGN PATENT DOCUMENTS

| CN | 106537957 A | 3/2017 |
| CN | 110636604 A | 12/2019 |

(Continued)

OTHER PUBLICATIONS

Nokia (Initiation of ESFB by a UE in the state 5GMM-REGISTERED, Attempting Registration Update, Jun. 3, 2020, IDS Feb. 9, 2022 , C1-203552, Ids submitted Aug. 28, 2023).*

(Continued)

*Primary Examiner* — Lakeram Jangbahadur
(74) *Attorney, Agent, or Firm* — Andy M. Han; Han IP PLLC

(57) ABSTRACT

Solutions pertaining to user equipment (UE) behavior for failed registration request or service request for emergency services fallback in mobile communications are proposed. An apparatus implemented in a UE determines a failure in attempting to initiate a mobility registration request procedure or a service request procedure with a network to perform an emergency service fallback. In response to the determining, the apparatus performs one or more operations including at least a UE non-access-stratum (NAS) layer in a $5^{th}$ Generation Mobility Management (5GMM) protocol informing an upper layer in the 5GMM protocol of the failure to cause the upper layer to attempt an emergency call in a different domain or via a different network.

5 Claims, 4 Drawing Sheets

(51) Int. Cl.
  *H04W 8/06* (2009.01)
  *H04W 60/04* (2009.01)
  *H04W 60/06* (2009.01)
  *H04W 76/19* (2018.01)

(56) References Cited

FOREIGN PATENT DOCUMENTS

| WO | WO 2019030429 A1 | 2/2019 | | |
|----|------------------|--------|---|---|
| WO | WO 2020003886 A1 | 1/2020 | | |
| WO | WO-2020069760 A1 | * 4/2020 | ............ | H04W 4/90 |
| WO | WO 2020074131 A1 | 4/2020 | | |
| WO | WO 2020096963 A1 | 5/2020 | | |
| WO | WO 2020098926 A1 | 5/2020 | | |

OTHER PUBLICATIONS

Nokia (Initiation of ESFB by a UE in the state 5GMM-Registered, Attempting Registration Update, Jun. 3, 2020, IDS Feb. 9, 2022).*

MediaTek (UE procedures when a request for emergency services fallback not accepted, Oct. 2020, IDS Feb. 9, 2022).*

European Patent Office, Extended European Search Report for European Patent Application No. 21188429.1, Dec. 23, 2021.

Nokia et al., "Initiation of ESFB by a UE in the state 5GMM-Registered.Attempting-Registration-Update", 3GPP Draft; CP-201103, 3GPP, Mobile Competence Centre, France, vol. CT WG1, No. Electronic meeting; Jun. 2, 2020-Jun. 10, 2020, Jun. 19, 2020, XP051902299.

Mediatek Inc., "UE procedures when a request for emergency services fallback not accepted", 3GPP Draft, C1-206428, 3GPP, Mobile Competence Centre, France, vol. CT WG1, No. Electronic meeting; Oct. 15, 2020-Oct. 23, 2020, Oct. 8, 2020, XP051951360.

Intellectual Property Office of India, Office Action for India Patent Application No. 202124037166, Mar. 22, 2022.

3rd Generation Partnership Project (3GPP), Technical Specification 24.501 version 16.0.0, Mar. 2019.

Nokia et al., "Initiation of ESFB by a UE in the state 5GMM-Registered.Attempting-Registration-Update", 3GPP TSG-CT WG1 Meeting #124-e, C1-203552, Electronic meeting, Jun. 2-10, 2020.

* cited by examiner

UE BEHAVIOR FOR FAILED REGISTRATION REQUEST OR SERVICE REQUEST FOR EMERGENCY SERVICES FALLBACK

CROSS REFERENCE TO RELATED PATENT APPLICATION(S)

The present disclosure is part of a non-provisional application claiming the priority benefit of India Patent Application No. 202021035558, filed 18 Aug. 2020, content of which being incorporated by reference in its entirety.

TECHNICAL FIELD

The present disclosure is generally related to mobile communications and, more particularly, to user equipment (UE) behavior for failed registration request or service request for emergency services fallback in mobile communications.

BACKGROUND

Unless otherwise indicated herein, approaches described in this section are not prior art to the claims listed below and are not admitted as prior art by inclusion in this section.

In wireless communications such as mobile communications according to the 3$^{rd}$ Generation Partnership Project (3GPP) specifications, a UE is to initiate an Emergency Services Fallback procedure for an emergency session establishment in case a 5$^{th}$ Generation (5G) Core Network (5GCN) indicates "Emergency Services Fallback" support for the tracking area (TA) and radio access technology (RAT) where the UE is currently camped and in case the UE supports emergency services fallback. However, under current 3GPP specification at the time of the invention, UE procedures for an emergency services fallback are not fully specified for cases when the network does not accept a registration request from the UE for the emergency services fallback or when the procedure fails for other reasons (e.g., due to message transmission failure). Moreover, under current 3GPP specification at the time of the invention, UE procedures are not fully specified for cases when the network does not accept a service request from the UE for the emergency services fallback. Therefore, there is a need for solutions that specify UE behavior for failed registration and service requests for emergency services fallback.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose schemes, designs, concepts, techniques, methods, systems and apparatus to address aforementioned issues. Specifically, various proposed schemes in accordance with the present disclosure pertain to UE behavior for failed registration and service requests for emergency services fallback in mobile communications.

In one aspect, a method may involve a UE determining a failure in attempting to initiate a mobility registration request procedure with a network to perform an emergency service fallback. The method may also involve the UE, responsive to the determining, performing one or more operations comprising at least a UE non-access-stratum (NAS) layer in a 5$^{th}$ Generation Mobility Management (5GMM) protocol informing an upper layer in the 5GMM protocol of the failure.

In another aspect, a method may involve a UE determining a failure in attempting to initiate a service request procedure with a network to perform an emergency service fallback. The method may also involve the UE, responsive to the determining, performing one or more operations comprising at least a UE NAS layer in a 5GMM protocol informing an upper layer in the 5GMM protocol of the failure.

In yet another aspect, an apparatus implementable in a UE may include a configured to wirelessly communicate with a network. The apparatus may also include a processor coupled to the transceiver. The processor may determine a failure in attempting to initiate a mobility registration request procedure or a service request procedure with a network to perform an emergency service fallback. The processor may also perform, responsive to the determining, one or more operations comprising at least a UE NAS layer in a 5GMM protocol informing an upper layer in the 5GMM protocol of the failure to cause the upper layer to attempt an emergency call in a different domain or via a different network.

It is noteworthy that, although description provided herein may be in the context of certain radio access technologies, networks and network topologies such as 5G New Radio (NR) mobile networking, the proposed concepts, schemes and any variation(s)/derivative(s) thereof may be implemented in, for and by other types of wireless and wired communication technologies, networks and network topologies such as, for example and without limitation, Ethernet, Evolved Packet System (EPS), Universal Terrestrial Radio Access Network (UTRAN), Evolved UTRAN (E-UTRAN), Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, Internet-of-Things (IoT), Narrow Band Internet of Things (NB-IoT), Industrial Internet of Things (IIoT) and any future-developed networking technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to UE behavior for failed registration and service requests for emergency services fallback in mobile communications. According to the present disclosure, a number of possible solutions may be implemented separately or jointly. That is, although these possible solutions may be described below separately, two or more of these possible solutions may be implemented in one combination or another.

Figure 1:
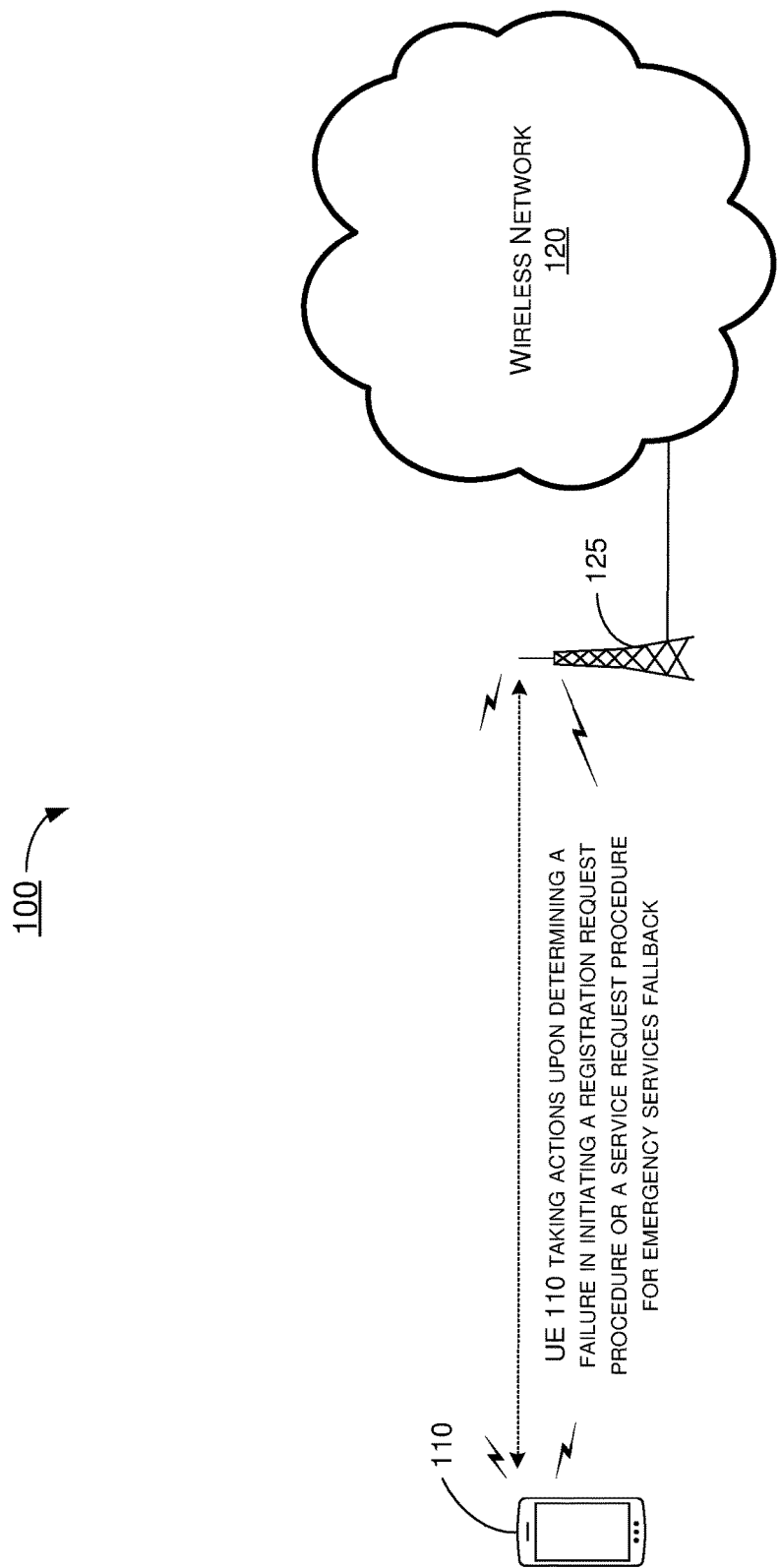
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. Referring to FIG. 1, network environment 100 may involve a UE 110 in wireless communication with a wireless network 120 (e.g., a 5G NR mobile network) as part of a communication network. UE 110 may initially be in wireless communication with wireless network 120 via a base station or network node 125 (e.g., an eNB, gNB or transmit-receive point (TRP)). In network environment 100, UE 110 and network 120 may implement various schemes pertaining to UE behavior for failed registration and service requests for emergency services fallback in mobile communications in accordance with the present disclosure, as described herein.

Under the current 3GPP specification, UE behavior is specified for registration reject with certain reject causes for emergency services. In particular, the current 3GPP specification specifies UE behavior in case UE 110 receives a registration reject with a cause #9 or #15. However, UE behavior for cases other than reject cause #9 and #15 are not specified. Additionally, UE behavior when a registration request fails due to lower layer failure and message transmission failure is not specified.

For example, in an event that UE 110 receives no response from network 120 (e.g., due to expiry of a timer T3517 which started at the time a service request was sent to network 120), in case the service type of the SERVICE REQUEST message was set to "emergency services fallback" and in case the service request procedure was triggered in a 5GMM-CONNECTED mode, according to the current 3GPP specification a 5GMM sublayer of UE 110 is to abort the procedure, stay in the 5GMM-CONNECTED mode, and inform upper layers of UE 110 of the failure of the emergency services fallback, as defined in 3GPP TS 24.229. However, UE behavior is not fully specified in case a service request for the emergency services fallback is not accepted.

Under a proposed scheme in accordance with the present disclosure with respect to UE behavior when a mobility registration request procedure for emergency services fallback fails, UE 110 may receive a registration reject message from network 120 as a response to the mobility registration request procedure attempting to perform emergency services fallback. The received reject message may have a reject cause #3, #10, #11, #12, #13, #22 or #27. Under the proposed scheme, upon receiving the reject message, UE 110 may perform one or more generic actions specific to the cause value. Additionally, regarding the cause value, UE 110 may de-register and perform an initial registration for emergency services. Alternatively, UE 110 may attempt to select an E-UTRA cell connected to an EPC or a 5GCN. Moreover, a UE NAS layer according to the 5GMM protocol implemented in UE 110 may inform upper layer(s) according to the 5GMM protocol implemented in UE 110 of the failure. This may cause or otherwise trigger UE 110 to attempt an emergency call in a different domain such as, for example, a circuit-switched (CS) domain or via different network such as, for example, an Internet Protocol-connectivity access network (IP-CAN).

Under the proposed scheme, in other abnormal cases that cause UE 110 to determine that there is a failure in attempting to initial a mobility registration request procedure (e.g., due to transmission failure or lower layer failure), UE 110 may de-register and perform an initial registration for emergency services. Alternatively, UE 110 may attempt to select an E-UTRA cell connected to an EPC or a 5GCN. Moreover, a UE NAS layer according to the 5GMM protocol implemented in UE 110 may inform upper layer(s) according to the 5GMM protocol implemented in UE 110 of the failure. This may cause or otherwise trigger UE 110 to attempt an emergency call in a different domain such as, for example, a CS domain or via different network such as, for example, an IP-CAN.

Under a proposed scheme in accordance with the present disclosure with respect to UE behavior when a service request procedure for emergency services fallback fails, UE 110 may receive a service reject message from network 120 with a reject cause #3, #6, #7, #9, #10, #11, #12, #13, #15, #22, #27 or #28. Under the proposed scheme, UE 110 may first perform one or more generic actions specific to the cause value. Additionally, regarding the cause value, UE 110 may de-register and perform an initial registration for emergency services. Alternatively, UE 110 may attempt to select an E-UTRA cell connected to an EPC or a 5GCN. In any case, under the proposed scheme, a UE NAS layer according to the 5GMM protocol implemented in UE 110 may inform upper layer(s) according to the 5GMM protocol implemented in UE 110 of the failure. This may cause or otherwise trigger UE 110 to attempt an emergency call in a different domain such as, for example, a CS domain or via different network such as, for example, an IP-CAN.

Under the proposed scheme, in other abnormal cases that cause UE 110 to determine that there is a failure in attempting to initial a service request procedure (e.g., due to transmission failure or lower layer failure), UE 110 may de-register and perform an initial registration for emergency services. Alternatively, UE 110 may attempt to select an E-UTRA cell connected to an EPC or a 5GCN. Moreover, a UE NAS layer according to the 5GMM protocol implemented in UE 110 may inform upper layer(s) according to the 5GMM protocol implemented in UE 110 of the failure. This may cause or otherwise trigger UE 110 to attempt an emergency call in a different domain such as, for example, a CS domain or via different network such as, for example, an IP-CAN.

Illustrative Implementations

Figure 2:
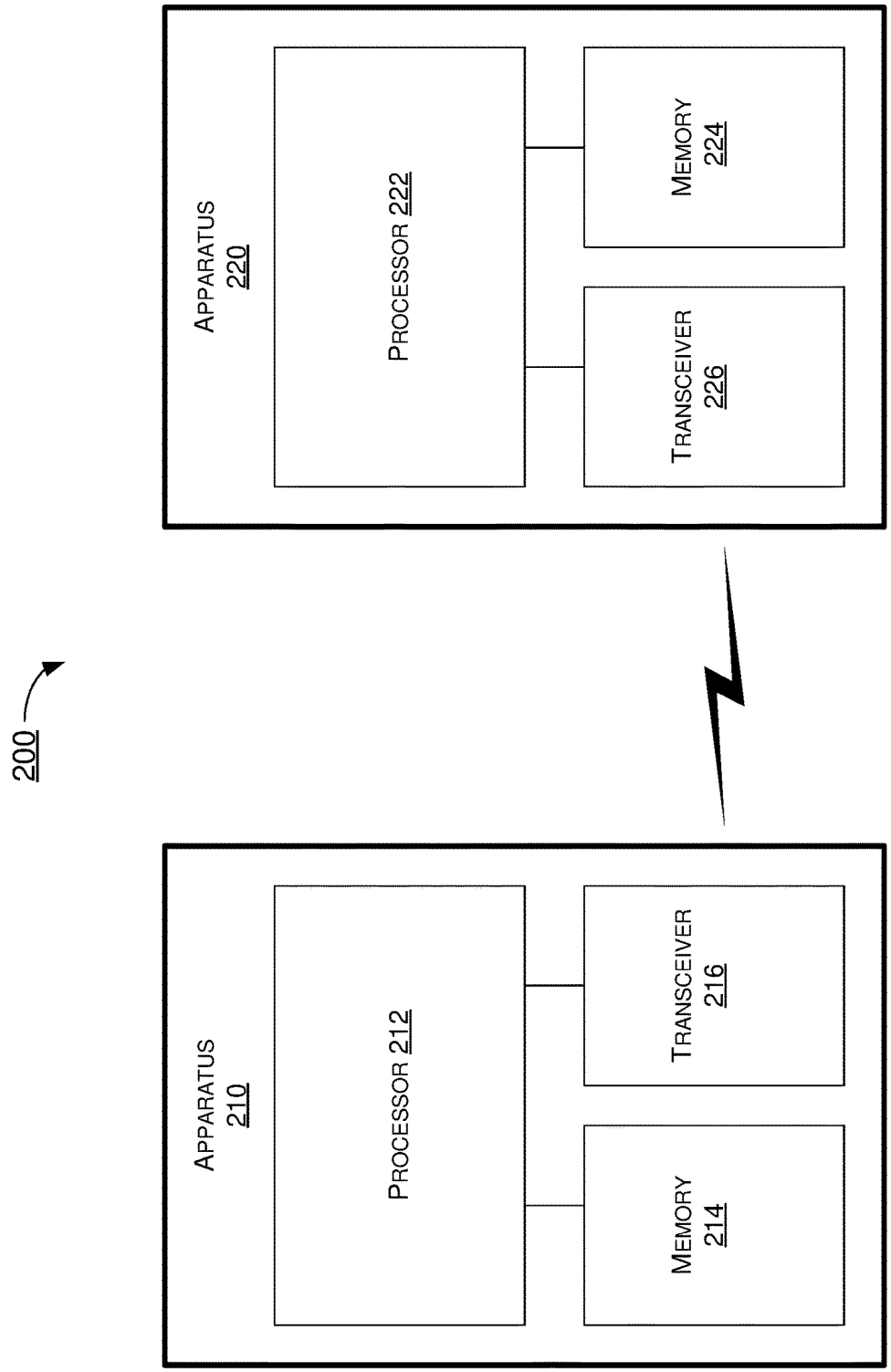
FIG. 2 is a block diagram of an example communication system in accordance with an implementation of the present disclosure.

FIG. 2 illustrates an example communication system 200 having at least an example apparatus 210 and an example apparatus 220 in accordance with an implementation of the present disclosure. Each of apparatus 210 and apparatus 220 may perform various functions to implement schemes, techniques, processes and methods described herein pertaining to UE behavior for failed registration and service requests for emergency services fallback in mobile communications, including the various schemes described above with respect to various proposed designs, concepts, schemes, systems and methods described above, including network environment 100, as well as processes described below.

Each of apparatus 210 and apparatus 220 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 210 and apparatus 220 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 210 and apparatus 220 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 210 and apparatus 220 may be implemented in a smart thermostat, a smart fridge, a smart door lock, a wireless speaker or a home control center. When implemented in or as a network apparatus, apparatus 210 and/or apparatus 220 may be implemented in an eNodeB in an LTE, LTE-Advanced or LTE-Advanced Pro network or in a gNB or TRP in a 5G network, an NR network or an IoT network.

In some implementations, each of apparatus 210 and apparatus 220 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 210 and apparatus 220 may be implemented in or as a network apparatus or a UE. Each of apparatus 210 and apparatus 220 may include at least some of those components shown in FIG. 2 such as a processor 212 and a processor 222, respectively, for example. Each of apparatus 210 and apparatus 220 may further include one or more other components not pertinent to the proposed scheme of the present disclosure (e.g., internal power supply, display device and/or user interface device), and, thus, such component(s) of apparatus 210 and apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC or RISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including those pertaining to UE behavior for failed registration and service requests for emergency services fallback in mobile communications in accordance with various implementations of the present disclosure.

In some implementations, apparatus 210 may also include a transceiver 216 coupled to processor 212. Transceiver 216 may be capable of wirelessly transmitting and receiving data. In some implementations, transceiver 216 may be capable of wirelessly communicating with different types of wireless networks of different radio access technologies (RATs). In some implementations, transceiver 216 may be equipped with a plurality of antenna ports (not shown) such as, for example, four antenna ports. That is, transceiver 216 may be equipped with multiple transmit antennas and multiple receive antennas for multiple-input multiple-output (MIMO) wireless communications. In some implementations, apparatus 220 may also include a transceiver 226 coupled to processor 222. Transceiver 226 may include a transceiver capable of wirelessly transmitting and receiving data. In some implementations, transceiver 226 may be capable of wirelessly communicating with different types of UEs/wireless networks of different RATs. In some implementations, transceiver 226 may be equipped with a plurality of antenna ports (not shown) such as, for example, four antenna ports. That is, transceiver 226 may be equipped with multiple transmit antennas and multiple receive antennas for MIMO wireless communications.

In some implementations, apparatus 210 may further include a memory 214 coupled to processor 212 and capable of being accessed by processor 212 and storing data therein. In some implementations, apparatus 220 may further include a memory 224 coupled to processor 222 and capable of being accessed by processor 222 and storing data therein. Each of memory 214 and memory 224 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 214 and memory 224 may include a type of read-only memory (ROM) such as mask ROM, programmable ROM (PROM), erasable programmable ROM (EPROM) and/or electrically erasable programmable ROM (EEPROM). Alternatively, or additionally, each of memory 214 and memory 224 may include a type of non-volatile random-access memory (NVRAM) such as flash memory, solid-state memory, ferroelectric RAM (FeRAM), magnetoresistive RAM (MRAM) and/or phase-change memory.

Each of apparatus 210 and apparatus 220 may be a communication entity capable of communicating with each other using various proposed schemes in accordance with the present disclosure. For illustrative purposes and without limitation, a description of capabilities of apparatus 210, as a UE (e.g., UE 110), and apparatus 220, as a network node (e.g., network node 125) of a wireless network (e.g., network 120 as a 5G/NR mobile network), is provided below.

Under various proposed schemes in accordance with the present disclosure pertaining to UE behavior for failed registration and service requests for emergency services fallback in mobile communications, processor 212 of apparatus 210 in a 5GS, implemented in or as UE 110, may determine a failure in attempting to initiate a mobility registration request procedure or a service request procedure with a network (e.g., network 120) to perform an emergency service fallback. Moreover, responsive to the determining, processor 212 may perform one or more operations including at least a UE NAS layer in a 5GMM protocol informing an upper layer in the 5GMM protocol of the failure to cause the upper layer to attempt an emergency call in a different domain or via a different network.

In some implementations, the different domain may include a CS domain. Alternatively, or additionally, the different network may include an IP-CAN.

In some implementations, in determining the failure, processor 212 may receive, via transceiver 216, a reject with a specific cause number from the network (e.g., via apparatus 220 as network node 125 of network 120) as a response to the attempting to perform the emergency service fallback. In such cases, responsive to determining the failure in attempting to initiate the mobility registration request procedure, the specific cause number may include cause #3, #10, #11, #12, #13, #22 or #27. Alternatively, responsive to determining the failure in attempting to initiate the service request procedure, the specific cause number may include cause #3, #6, #7, #9, #10, #11, #12, #13, #15, #22, #27 or #28. Moreover, the one or more operations may further include the following: (a) performing an action specific to the specific cause number; (b) regarding the specific cause number: (i) de-registering; and (ii) performing an initial registration for an emergency service; or (c) attempting to select an E-UTRA cell connected to an EPC or a 5GCN.

In some implementations, in determining the failure, processor 212 may determine that there is a transmission failure or a lower layer failure. In such cases, the one or more operations may further include the following: (a) regarding the specific cause number: (i) de-registering; and (ii) performing an initial registration for an emergency service; or (b) attempting to select an E-UTRA cell connected to an EPC or a 5GCN.

Illustrative Processes

Figure 3:
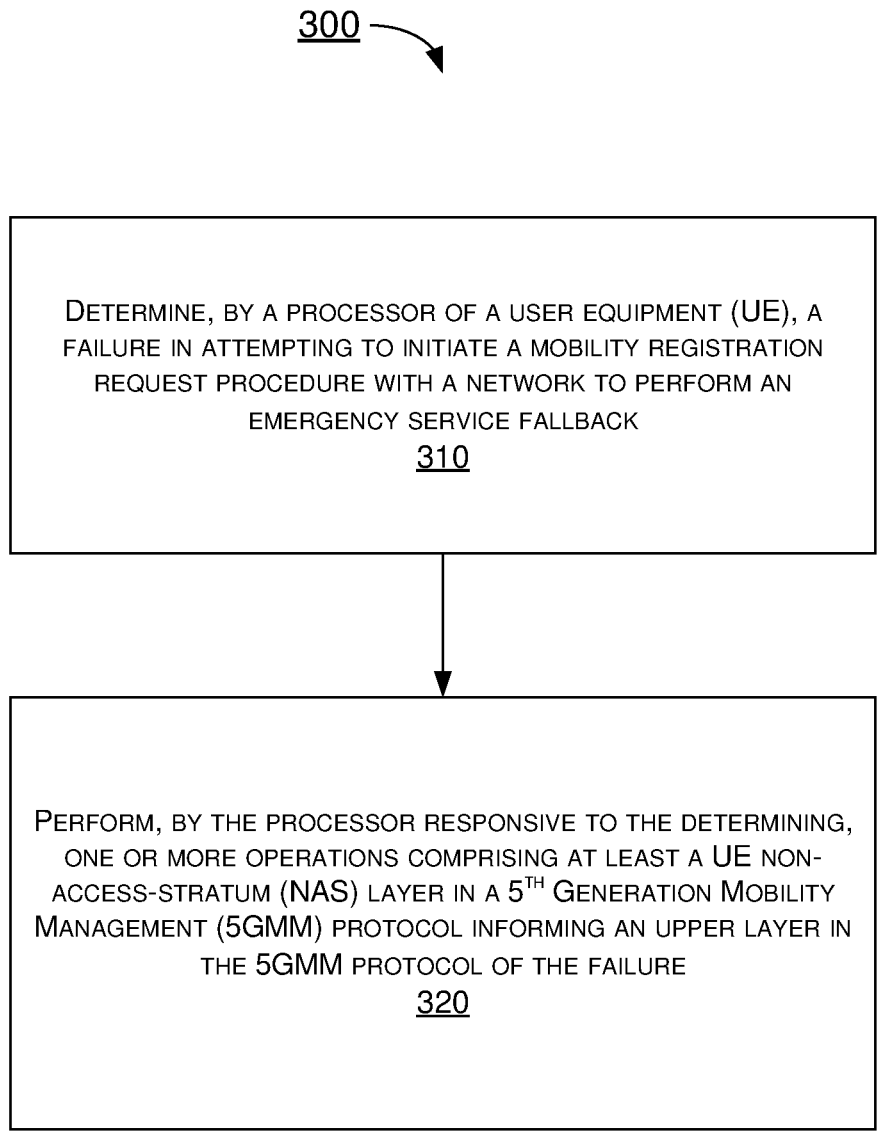
FIG. 3 is a flowchart of an example process in accordance with an implementation of the present disclosure.

FIG. 3 illustrates an example process 300 in accordance with an implementation of the present disclosure. Process 300 may represent an aspect of implementing various proposed designs, concepts, schemes, systems and methods described above, whether partially or entirely, including those pertaining to those described above. More specifically, process 300 may represent an aspect of the proposed concepts and schemes pertaining to UE behavior for failed registration and service requests for emergency services fallback in mobile communications. Process 300 may include one or more operations, actions, or functions as illustrated by one or more of blocks 310 and 320. Although illustrated as discrete blocks, various blocks of process 300 may be divided into additional blocks, combined into fewer blocks, or eliminated, depending on the desired implementation. Moreover, the blocks/sub-blocks of process 300 may be executed in the order shown in FIG. 3 or, alternatively in a different order. Furthermore, one or more of the blocks/sub-blocks of process 300 may be executed iteratively. Process 300 may be implemented by or in apparatus 210 and apparatus 220 as well as any variations thereof. Solely for illustrative purposes and without limiting the scope, process 300 is described below in the context of apparatus 210 as a UE (e.g., UE 110) and apparatus 220 as a communication entity such as a network node or base station (e.g., network node 125) of a wireless network (e.g., wireless network 120). Process 300 may begin at block 310.

At 310, process 300 may involve processor 212 of apparatus 210 determining a failure in attempting to initiate a mobility registration request procedure with a network (e.g., network 120) to perform an emergency service fallback. Process 300 may proceed from 310 to 320.

At 320, process 300 may involve processor 212 performing, responsive to the determining, one or more operations. In some implementations, the one or more operations may include at least a UE NAS layer in a 5GMM protocol informing an upper layer in the 5GMM protocol of the failure.

In some implementations, the upper layer may be triggered to attempt an emergency call in a different domain or via a different network responsive to the UE NAS layer informing the upper layer of the failure. In some implementations, the different domain may include a CS domain. Alternatively, or additionally, the different network may include an IP-CAN.

In some implementations, in determining the failure, process 300 may involve processor 212 receiving, via transceiver 216, a reject with a specific cause number from the network (e.g., via apparatus 220 as network node 125 of network 120) as a response to the attempting to perform the emergency service fallback. In some implementations, the specific cause number may include cause #3, #10, #11, #12, #13, #22 or #27. In such cases, the one or more operations may further include the following: (a) performing an action specific to the specific cause number; (b) regarding the specific cause number: (i) de-registering; and (ii) performing an initial registration for an emergency service; or (c) attempting to select an E-UTRA cell connected to an EPC or a 5GCN.

In some implementations, in determining the failure, process 300 may involve processor 212 determining that there is a transmission failure or a lower layer failure. In such cases, the one or more operations may further include the following: (a) regarding the specific cause number: (i) de-registering; and (ii) performing an initial registration for an emergency service; or (b) attempting to select an E-UTRA cell connected to an EPC or a 5GCN.

Figure 4:
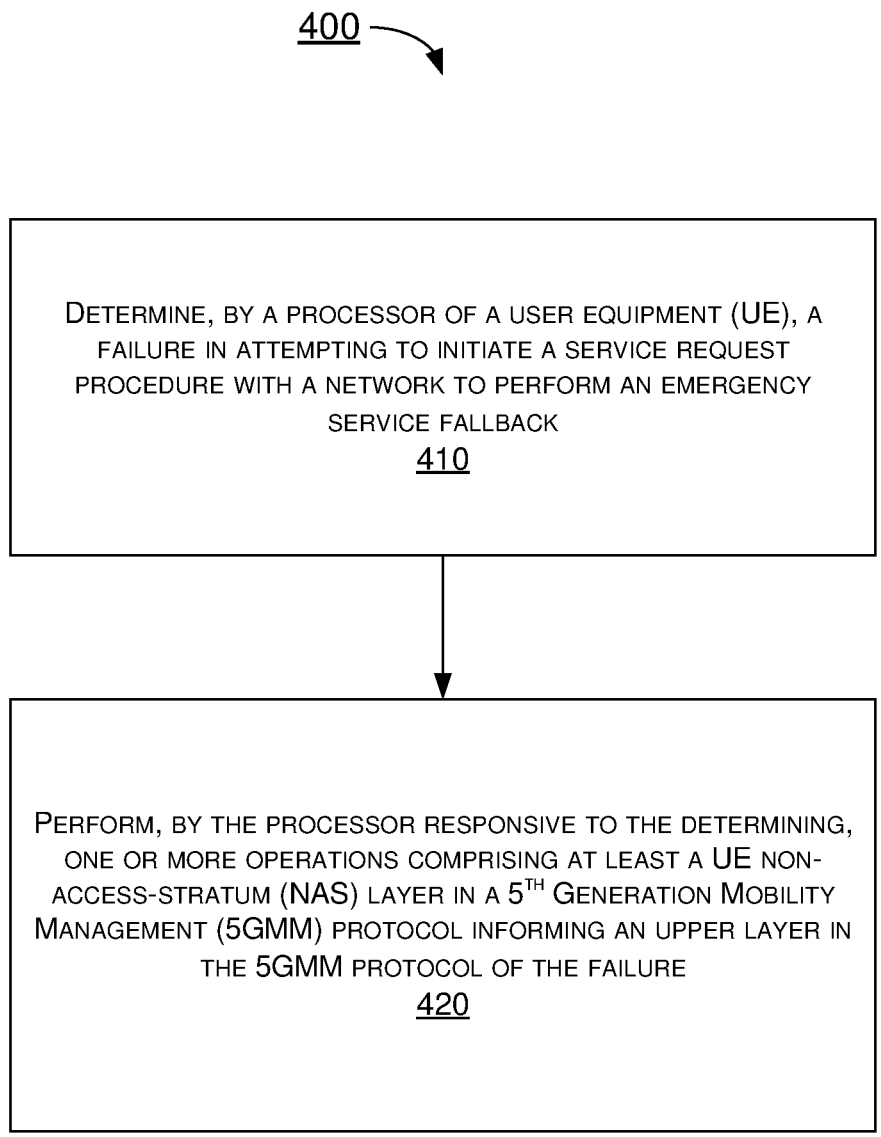
FIG. 4 is a flowchart of an example process in accordance with an implementation of the present disclosure.

FIG. 4 illustrates an example process 400 in accordance with an implementation of the present disclosure. Process 400 may represent an aspect of implementing various proposed designs, concepts, schemes, systems and methods described above, whether partially or entirely, including those pertaining to those described above. More specifically, process 400 may represent an aspect of the proposed concepts and schemes pertaining to UE behavior for failed registration and service requests for emergency services fallback in mobile communications. Process 400 may include one or more operations, actions, or functions as illustrated by one or more of blocks 410 and 420. Although illustrated as discrete blocks, various blocks of process 400 may be divided into additional blocks, combined into fewer blocks, or eliminated, depending on the desired implementation. Moreover, the blocks/sub-blocks of process 400 may be executed in the order shown in FIG. 4 or, alternatively in a different order. Furthermore, one or more of the blocks/ sub-blocks of process 400 may be executed iteratively. Process 400 may be implemented by or in apparatus 210 and apparatus 220 as well as any variations thereof. Solely for illustrative purposes and without limiting the scope, process 400 is described below in the context of apparatus 210 as a UE (e.g., UE 110) and apparatus 220 as a communication entity such as a network node or base station (e.g., network node 125) of a wireless network (e.g., wireless network 120). Process 400 may begin at block 410.

At 410, process 400 may involve processor 212 of apparatus 210 determining a failure in attempting to initiate a service request procedure with a network (e.g., network 120) to perform an emergency service fallback. Process 400 may proceed from 410 to 420.

At 420, process 400 may involve processor 212 performing, responsive to the determining, one or more operations. In some implementations, the one or more operations may include at least a UE NAS layer in a 5GMM protocol informing an upper layer in the 5GMM protocol of the failure.

In some implementations, the upper layer may be triggered to attempt an emergency call in a different domain or via a different network responsive to the UE NAS layer informing the upper layer of the failure. In some implementations, the different domain may include a CS domain. Alternatively, or additionally, the different network may include an IP-CAN.

In some implementations, in determining the failure, process 400 may involve processor 212 receiving, via transceiver 216, a reject with a cause number from the network (e.g., via apparatus 220 as network node 125 of network 120) as a response to the attempting to perform the emergency service fallback. In some implementations, the specific cause number may include cause #3, #6, #7, #9, #10, #11, #12, #13, #15, #22, #27 or #28. In such cases, the one or more operations may further include the following: (a) performing an action specific to the specific cause number; (b) regarding the specific cause number: (i) de-registering; and (ii) performing an initial registration for an emergency service; or (c) attempting to select an E-UTRA cell connected to an EPC or a 5GCN.

In some implementations, in determining the failure, process 400 may involve processor 212 determining that there is a transmission failure or a lower layer failure. In such cases, the one or more operations may further include the following: (a) regarding the specific cause number: (i) de-registering; and (ii) performing an initial registration for an emergency service; or (b) attempting to select an E-UTRA cell connected to an EPC or a 5GCN.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

determining, by a user equipment (UE), a failure in an attempt to initiate a mobility registration request procedure with a network to perform an emergency service fallback, wherein the determining that the failure occurred is based upon:

receiving a reject, with a specific 5th Generation Mobility Management (5GMM) cause number indicating a reason of rejection, from the network as a response to the attempting; and performing, by the UE responsive to the determining, one or more operations comprising:

receiving the reject from the network with the specific 5GMM cause number of the reject for the failure in the attempt to initiate the mobility registration request procedure to perform the emergency service fallback being cause #3 (illegal UE) or #11 (PLMN not allowed) or #12 (Tracking area not allowed) or #13 (Roaming not allowed in this tracking area) or #22 (Congestion) or #27 (N1 mode not allowed) as defined in the 3rd Generation Partnership Project (3GPP) specification pertaining to the 5GMM protocol; and informing, via a UE non-access-stratum (NAS) layer in a 5GMM protocol, an upper layer of a 5GMM protocol layer for the failure when the reject from the network is received with the specific 5GMM cause number cause;

wherein the upper layer is triggered to attempt an emergency call in a different domain or via a different network responsive to the UE NAS layer informing the upper layer of the failure and wherein either the different domain comprises a circuit-switched (CS) domain or the different network comprises an Internet Protocol-connectivity access network (IP-CAN).

2. The method of claim 1, wherein the one or more operations further comprise:

performing an initial registration for an emergency service when the reject from the network is received or when the abnormal case occurred.

3. The method of claim 1, wherein the determining that the attempt fails due to an abnormal case comprises determining that there is a transmission failure or a lower layer failure.

4. The method of claim 1, wherein the one or more actions comprise at least one of setting 5th Generation System (5GS) update status, handling 5GMM parameters, or handling of EPS Mobility Management (EMM) parameters.

5. The method of claim 1, wherein the performing the one or more actions includes performing one or more corresponding actions when the reject from the network is received and the specific 5GMM cause number of the reject for failure in the attempt to initiate the mobility registration request procedure is cause #22 as defined in the 3rd Generation Partnership Project (3GPP) specification pertaining to the 5GMM protocol.

* * * * *